March 4, 1952 L. J. WEBER ET AL 2,588,313
WEDGE CLOSURE FITTING
Filed Jan. 7, 1948

INVENTOR.
Louis J. Weber
BY Luther D. Ringo
Darby & Darby
Att'ys

Patented Mar. 4, 1952

2,588,313

UNITED STATES PATENT OFFICE 2,588,313

WEDGE CLOSURE FITTING

Louis Joe Weber, Bartlesville, Okla., and Luther David Ringo, Borger, Tex., assignors to Phillips Petroleum Company, a corporation of Delaware Application January 7, 1948, Serial No. 936

6 Claims. (Cl. 220—57)

This invention is for an improved closure fitting of the wedge locked type.

The broad object of this invention is to provide a wedge locked type of closure fitting for the charging and cleaning out of containers of various forms such as pipes, retorts, reaction vessels, catalyst chambers, and the like.

An object of this invention is to provide two forms of such fitting adapted to the repair of similar fittings already in use and to the installation of new fittings on new installations.

The invention is of special value in sealing the charging and cleaning out openings of containers or vessels which in normal use are operated at relatively high or cyclic temperatures and/or pressures.

A more specific object of the invention is to provide an easily manipulatable fitting by means of which access to the vessel or container is easily possible and by means of which the vessel or container can be positively sealed after access.

Other and more detailed objects of the invention will be apparent from the following description of the two embodiments thereof illustrated in the attached drawings and described hereinafter in connection therewith.

This invention resides substantially in the combination, construction, arrangement and relative location of parts, all as will be described in detail below.

In the accompanying drawings.

It is common practice in many fields of use, and particularly in the chemical field, to provide containers such as pipes, retorts, reaction vessels, catalyst chambers and the like with charging and cleanout openings with which are associated fixtures by means of which access therethrough is easily attained and which are adapted to effective sealing even under conditions of high temperature and/or pressure operation. From experience it has been found that within the limits of reasonable economy it is difficult to provide a simple fixture which can be opened readily and which can be quickly and easily closed to provide a leakproof seal. The purpose of this invention is to provide a simplified fitting, one comprising a modification of fittings already installed and the other a modification for new installations by means of which at low cost access is facilitated and an effective seal is secured.

Figure 1:
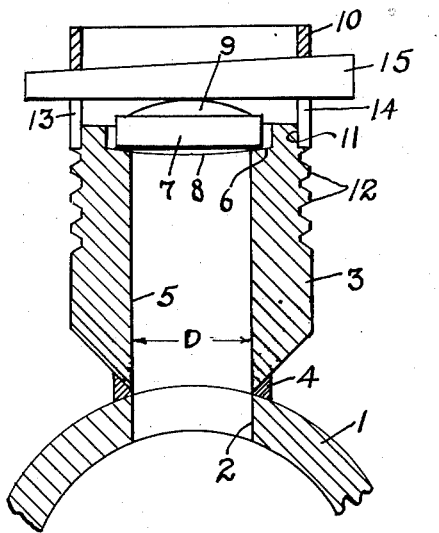
Figure 1 is a vertical, central, cross-sectional view through a form of the invention employed in modifying charging and cleanout fittings of an extensively used type which have become ineffective by excessive wear.
Figure 5:
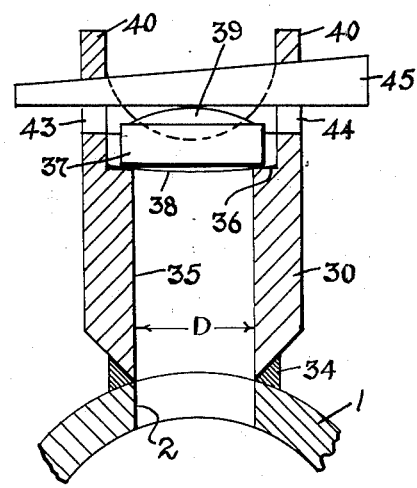
Figure 5 is a vertical, central, cross-sectional view through a fitting in accordance with the other form of the invention herein disclosed as applied to new fittings.
Figure 2:
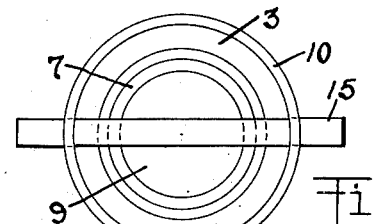
Figure 2 is a top plan view of this fitting as modified in accordance with this invention.
Figure 6:
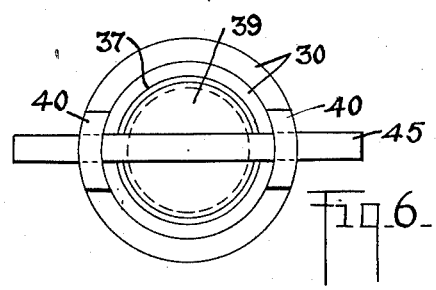
Figure 6 is a top plan view thereof.

The invention was first developed in connection with the fitting illustrated in Figures 1 and 2, which due to use became worn to the point where they did not provide an effective seal when closed. The problem was to provide a repair therefor which would avoid the necessity of providing a new fitting. In Figures 5 and 6 are illustrated the application of these same principles to a new fitting.

In the drawings the container has been illustrated as a pipe 1, having an opening 2 through which access to the interior of the pipe is possible. In prior practice a fitting comprising a cylindrical metallic body 3 was attached to the pipe 1 with the passage 5 of the fitting in alignment with the opening 2 of the pipe by means of the weld 4. The upper end of the fitting 3 is recessed to provide a spherical seat 6 on which a plug or valve member 7, having a spherical seat 8, rests. This prior fitting is provided with an exterior thread 12 by means of which an interiorly threaded cap, not shown, was mounted on the fitting so as to engage the plug 7 and force it onto its seat under pressure. However, over a period of time the threads 12 and the threads on the cap became so worn and oxidized that an effective seal could not be obtained. As there were many thousands of such fittings in use the problem of modifying them to return them to good condition arose.

Figure 3:
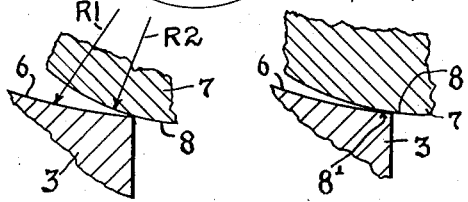
Figure 3 shows an enlarged detailed cross-sectional view through the seat and cooperating valve before they are wedged into sealing relation.

In accordance with this invention the fitting 3 was provided with an annular seat 11 at its upper threaded end on which a ring 10 was fitted and the two parts welded together. The ring 10 was mounted with a pair of diametrically aligned openings 13 and 14 of such relative length as to permit of the insertion and seating of a wedge 15 between the ends of the openings 14 and the curved, as for example spherical, top 9 of the plug 7. With this arrangement it is possible by driving the wedge 15 axially to cause the spherical seats 6 and 8 to engage in a sealing contact such as is effective even at relatively high temperatures and pressures. The seating surface 8 of the valve member 7 is forced into engagement with the seating surface 6 of the fitting 3 so as to deform these seating surfaces into an annular band 8' of contact as distinguished from a circular line of contact when they are engaged under no pressure as indicated in Figure 3. Thus there is created a sealing condition which insures against leakage under high temperatures and pressures.

While the operations of forming the annular seat 11, attaching the ring 10 and reforming the seat 6 can be accomplished without removing the fitting from the vessel 1, it is apparent that if the economics of the situation are considered, this fitting can be detached for these repair operations and rewelded in place.

The same principles are applied to new fittings as illustrated in Figures 5 and 6. In this case the fitting consists of a cylindrical body 30 of metal having a passage 35 to be aligned with the opening 2 in the vessel 1 when the fitting is mounted on the vessel as by welding, as indicated to provide a spherical seat 36 on which the spherical seating surface 38 of the plug or valve member 37 rests. The top surface of the plug 37 is spherical, as indicated at 39. At diametrically opposed points the fitting 30 is provided with a pair of extensions or ears 40 having aligned passages 43 and 44 therein to receive the wedge 45. As in the previous case this wedge engages the spherical top 39 of the plug 37 forcing the plug into seating engagement with the fitting seat 36 while allowing it to rock or rotate so as to effect an equalized seating engagement between the seating surfaces 36 and 38.

Figure 4:
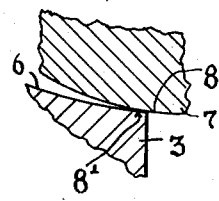
Figure 4 is a similar view showing them wedged into sealing relation.

In both cases it is contemplated that the radii R1 and R2 of the seating surfaces 6 and 8 respectively will be different, as illustrated in Figure 3. This figure shows these seating surfaces engaged under little or no pressure, while Figure 4 shows a relative position when engaged under pressure such as would be created by the wedges of the structures previously described. From substantially aligned contact, as illustrated in Figure 3, under pressure these surfaces engage over a more extended area which on study will be seen to be in the form of an annular band of radial width substantially greater than aligned contact. Thus with this structure the plug may find an equalized pressure relationship with respect to the fitting and under stress the area of contact between the seats 6 and 8 and 36 and 38 will be increased to insure an effective seal which can be quickly and easily attained by means of the locking wedges.

From experience it has been found that the relationship of the radii R1 and R2 is critical. The preferable range of sizes of the radii which is critical in order to obtain the full benefits of this invention is such that the difference in the length of radii R1 and R2 when the diameter D approaches zero is from 1/8" to 3/8" and when D is of the order of 8" the difference between these radii is in the range of from 1/2" to 1". For other sizes of diameter D the same proportional radial relationship is preferably maintained. Excellent results are secured when R2 is preferably from 1 1/2 to 2 1/2 times the diameter D.

Within the conditions defined by these formulae it has been found by experience that very effective seals for fittings of this type may be secured on vessels or containers operating at normal temperatures or pressures, as well as at relatively high temperatures and pressures such as are encountered in many chemical processes.

From the above description it will be apparent to those skilled in the art that the details of this invention are subject to some variation, and we do not, therefore, desire to be strictly limited to the illustrated embodiments herein described, but rather by the claims granted us.

What is claimed is:

1. A closure fitting for a vessel subject to high temperatures and high pressures comprising in combination a body secured to a vessel having a bore in communication with the interior of the vessel, said body being formed with an annular seat disposed at the outer end of said bore, the surface of said annular seat being substantially a zone of a first sphere, the radius of said first sphere being R1, a plug mounted on said seat having a seat which is a zone of said second sphere, the radius of which being R2, and R1 minus R2 equals 1 inch or less and where D the diameter of said bore is 8 inches or less, said plug having a curved surface on the top, and means interposed between said body and the top of said plug to lock it on the seat of said body under pressure.

2. A closure fitting of the type described comprising a body having a longitudinal passage therethrough and a terminal spherical seat therein, a plug having an upper curved surface and a lower spherical surface for engaging said seat, a collar surrounding said seat and having diametrically opposed openings therein, and a wedge member engaging the curved top of said plug and said ring through said openings to firmly force the spherical bottom of the plug onto the spherical seat of the body.

3. In the combination of claim 2, where D is the diameter of the passage in said body, R1 is the radius of said spherical seat and R2 is the radius of the spherical bottom of said plug, the relationship that R2 is from 1 1/2 to 2 1/2 times D and R1 is larger than R2.

4. In the combination of claim 2, the radii of said spherical seating surfaces bearing the relationship of R1 minus R2 equals 1/8 to 3/8 inch for small sizes of D, where R1 is the radius of said spherical seat on said body, R2 is the radius of the spherical surface on the bottom of said plug, and D is the diameter of said passage.

5. In the combination of claim 2, the radii of said spherical seating surfaces bearing the relationship of R1 minus R2 equals 1/2 to 1 inch when D is approximately 8 inches where R1 is the radius of said spherical seat on said body, R2 is the radius of the spherical surface on the bottom of said plug, and D is the diameter of said passage.

6. In the combination of claim 2, the radii of said spherical seating surfaces bearing the relationship of R1 minus R2 equals 1/8 to 3/8 inch approximately when D is less than 8 inches, where R1 is the radius of said spherical seat on said body, R2 is the radius of the spherical surface on the bottom of said plug, and D is the diameter of the passage in said body.

LOUIS JOE WEBER.
LUTHER DAVID RINGO.

REFERENCES CITED

The following references are of record in the file of this patent:

UNITED STATES PATENTS

| Number | Name | Date |
|---|---|---|
| 222,738 | Robinson | Dec. 16, 1879 |
| 304,478 | Weston | Sept. 2, 1884 |
| 670,977 | Watson | Apr. 2, 1901 |
| 1,048,825 | Griffiths | Dec. 31, 1912 |
| 1,168,933 | Burkley et al. | Jan. 18, 1916 |
| 1,664,270 | Shelvin | Mar. 27, 1928 |
| 2,083,011 | Ducummun | June 8, 1937 |
| 2,092,401 | Miller | Oct. 18, 1938 |
| 2,133,917 | Clifton | Oct. 18, 1938 |
| 2,352,382 | Hendricks | June 27, 1944 |

FOREIGN PATENTS

| Number | Country | Date |
|---|---|---|
| 58,448 | Germany | Aug. 27, 1891 |